United States Patent
Wilson et al.

(10) Patent No.: US 7,091,462 B2
(45) Date of Patent: Aug. 15, 2006

(54) TRANSMITTER WITH LASER MONITORING AND WAVELENGTH STABILIZATION CIRCUIT

(75) Inventors: Arthur G. Wilson, West Melbourne, FL (US); David Slapo, Jr., Palm Bay, FL (US); James V. Wernlund, Indialantic, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 207 days.

(21) Appl. No.: 10/647,558

(22) Filed: Aug. 25, 2003

(65) Prior Publication Data

US 2004/0036007 A1    Feb. 26, 2004

Related U.S. Application Data

(60) Provisional application No. 60/405,736, filed on Aug. 26, 2002.

(51) Int. Cl.
 *G01J 1/32* (2006.01)
 *H01S 3/10* (2006.01)
 *H01S 3/04* (2006.01)

(52) U.S. Cl. .................... 250/205; 372/20; 372/32; 372/34

(58) Field of Classification Search ............. 250/205, 250/238, 239; 372/32, 34, 38.01, 20, 29.02, 372/29.01, 29.011, 29.014
See application file for complete search history.

(56) References Cited

U.S. PATENT DOCUMENTS

| | | | |
|---|---|---|---|
| 5,024,535 A | 6/1991 | Winston, Jr. | 374/178 |
| 5,266,792 A | 11/1993 | Crowne et al. | 250/214 |
| 6,233,045 B1 * | 5/2001 | Suni et al. | 356/28.5 |
| 6,243,403 B1 * | 6/2001 | Broutin et al. | 250/205 |
| 6,359,918 B1 * | 3/2002 | Bielas | 372/32 |
| 6,697,388 B1 * | 2/2004 | Broutin et al. | 372/32 |
| 6,839,364 B1 * | 1/2005 | Broutin et al. | 372/20 |

* cited by examiner

*Primary Examiner*—Thanh X. Luu
(74) *Attorney, Agent, or Firm*—Allen, Dyer, Doppelt, Milbrath & Gilchrist, P.A.

(57) ABSTRACT

An optical monitoring circuit includes a photoelectric device such as a photo-detector that produces a signal in response to incident light thereon corresponding to a characteristic of the incident light such as intensity, or wavelength. A light source is disposed within the circuit for emitting a beam of light, a portion of which is to be incident upon the photoelectric device. The photoelectric device when reversed biased provides an output electrical signal from which the intensity of light from the light source impinging thereon can be determined. The photoelectric device when forward biased provides an output signal from which the temperature of the photoelectric device can be determined. A method and circuit are disclosed for calibrating out the unwanted effect of light from the light source affecting accuracy of the determined temperature derived from the output signal when the photoelectric device is forward biased.

11 Claims, 3 Drawing Sheets

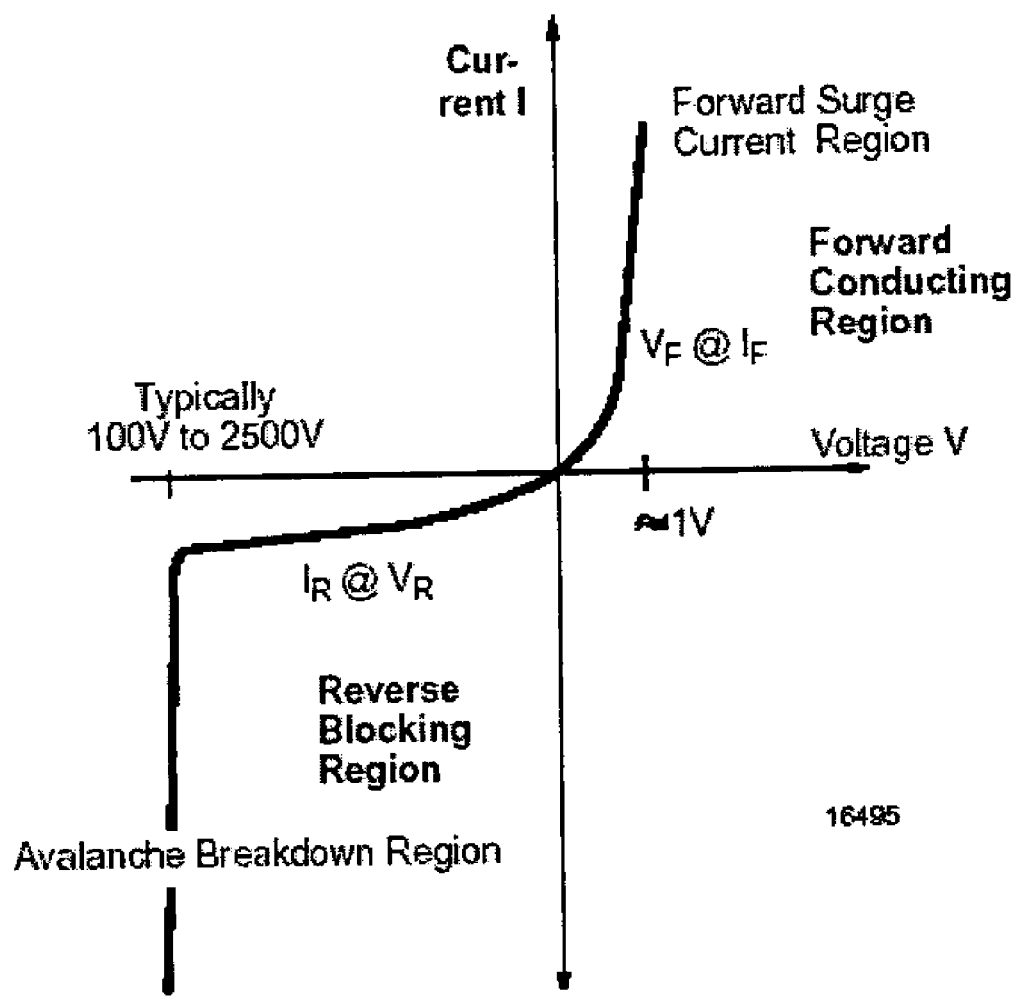
Figure 2: Typical Diode Current vs. Voltage Characteristics

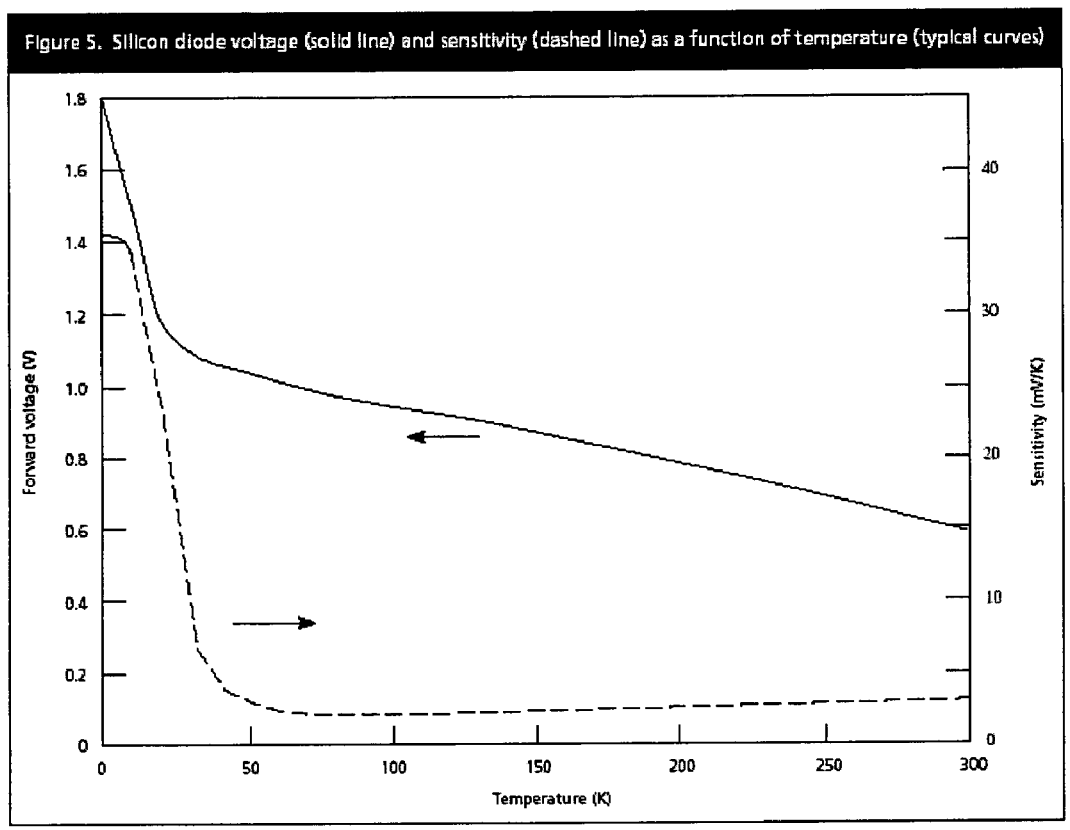
Figure 3 Typical Diode Voltage and Differential Voltage as a Function of Temperature.

TRANSMITTER WITH LASER MONITORING AND WAVELENGTH STABILIZATION CIRCUIT

CROSS REFERENCE TO RELATED APPLICATION

This application claims priority of U.S. Provisional Patent Application No. 60/405,736 filed Aug. 26, 2002, entitled "Method For Laser Temperature Measurement With Monitor Photodiode", which is incorporated herein by reference for all purposes.

FIELD OF THE INVENTION

This invention relates to a laser diode within a package having an output signal with a non-varying output wavelength as temperature outside the laser package varies.

BACKGROUND OF THE INVENTION

A communications laser is frequently placed in a hermetic package that includes a photodiode optically coupled to the laser diode. The photodiode forms part of a feedback circuit, which samples a portion of the laser light to produce a photocurrent used to control the bias current of the laser in order to stabilize the light output power thereof. Typically these photodiodes are physically mounted very close to the laser, which results in a close thermal coupling between the laser and photodiode. In some instances, the laser and the photodiode may be at different temperatures, due to temperature changes outside the package in which they reside.

Cooled lasers used for fixed wavelength dense wavelength division multiplexing (DWDM) applications, which require control of wavelength to within +/−100 pm, normally include a thermistor within the laser housing to measure the internal temperature of the package.

The resistance of the thermistor, which varies as a non-linear function of temperature, is used as a feedback mechanism to indirectly measure the laser temperature and to provide an indication of the laser wavelength. The resistance value of the thermistor is kept constant by use of a Peltier effect thermoelectric cooler (TEC) device inside the laser housing, upon which sits the thermistor, the monitor photodiode, and the laser. The feedback from the thermistor controls the current through the TEC to maintain a constant temperature resulting in a constant thermistor resistance value and a constant laser wavelength. The thermistor is typically considered be the weakest link in the wavelength control loop, i.e. a thermistor's drift with time is a main cause of wavelength drift in a D WDM laser source. A thermistor also requires space within the housing, adds two feed-throughs to the laser package, and increases cost and assembly complexity.

U.S. Pat. No. 5,266,792 in the names Crowne et al. entitled Temperature Compensated Optical Detector, issued November 1993, incorporated herein by reference, describes an optical wavelength detector wherein the use of a thermistor is obviated by using a photodiode as both a wavelength or intensity detector when reversed biased, and as a temperature sensor when forward biased. The circuit described by Crowne et al, includes means for ensuring that light from the lightsource being monitored is prevented from impinging upon the photoelectric feedback device when it is forward biased.

U.S. Pat. No. 5,024,535 in the name of Winston Jr. entitled Semiconductor Light Source Temperature Measurement also discloses the use of a photodiode in forward biased mode as a temperature sensor. A sensed voltage is converted into a temperature signal by the signal processor using a known temperature-voltage relationship of the sensing device.

Accordingly, it is well known that by simply using the output of the photodiode in a forward biased mode, an indication of temperature can be attained. Notwithstanding, more accurate results can be acquired by obviating the deleterious effect of allowing the light from the laser diode light source to couple into the photodetector when it is forward biased, sensing temperature. As mentioned heretofore, U.S. Pat. No. 5,266,792 provides means for interrupting the light source intermittently when temperature is being sensed. Although this solution may provide some advantages, during the measurement of temperature, the light source is switched off and the measurement is not a true measurement of the device with the laser on. Furthermore, data transmission must be halted during the time the light source is switched off; which is unacceptable in many instances. Furthermore, the circuitry required in this embodiment is more complex and less convenient to place in a small hermetic package. Moreover, the output wavelength of the laser diode will usually vary when the outside temperature surrounding the laser package changes. Therefore, if a forward biased photodiode is used as an indicator of temperature, an unwanted change in output wavelength of a laser diode thermally coupled to the detector may occur, as a result of a change in temperature outside the laser package, since the photodiode detector voltage-temperature curve is not a true indication of the temperature of the laser diode. More particularly, the operation of the all of the interconnected components and their related, but different, temperatures will affect the laser output signal wavelength. In the instance in which the forward biased photodiode presents a voltage indicating a corresponding temperature, using this voltage alone, as the only indicator that the output wavelength has or may have changed due to a temperature change, can result in the output wavelength of the laser drifting, even when it is desired to maintain the output at a constant wavelength.

It is an object of this invention, to provide a method and device that will maintain the output laser signal at a substantially constant wavelength by compensating for temperature changes outside the laser package, the voltage temperature relationship of the forward biased photodiode, any small difference in temperature of the detector and the laser diode, and the effects of the laser light impinging upon the forward biased detector while it is sensing temperature. By using outside temperature with the forward biased detector voltage to control a thermoelectric cooler, the output laser signal can be conveniently controlled. This also obviates having additional unwanted components such as a thermistor within the laser package.

In accordance with this invention, it has been found that comparing a voltage provided by the forward biased diode to a compensated voltage stored in memory related to the outside temperature about the package and related to the power of the laser diode, provides more accurate results and an output diode laser signal having a more stable wavelength.

The present invention provides a solution where the overall size of the device is reduced, cost is lessened and efficiency and longevity may be increased by elimination of components otherwise required by prior art devices.

It is an object of this invention to provide, within a laser package, a monitor of the laser sub-mount temperature that does not require the presence of a thermistor or other separate internal temperature measurement device. It is a further object of the invention to provide an output laser signal having a substantially constant wavelength while the light source remains on, in real-time, such that data transmission does not have to be halted. This invention can also be used for an un-cooled laser to provide an accurate monitor of the laser temperature in packages where a thermistor is not normally included. In the un-cooled laser application, accurate temperature feedback can be used to adjust drive or bias currents over temperature to maintain a consistent level of performance from the transmitter.

SUMMARY OF THE INVENTION

Accordingly, the present invention relates to a transmitter for providing a wavelength stabilized output signal having a wavelength $W_s$ comprising:
 a package for housing electronic and optical components;
 a light source disposed within the package for providing the output signal;
 a photodetector disposed within the package in close proximity to the light source, wherein at least a portion of the output signal is optically coupled to the photodetector;
 switching means for changing a bias on the photodetector between forward bias mode and reverse bias mode, whereby the photodetector provides an indication of the output power of the light source output signal when the photodetector is in the reverse bias mode, and a signal that is related to the temperature and output power of the light source when the photodetector is in the forward bias mode; a temperature sensor disposed outside of the package for providing a signal indicating an ambient temperature about the package;
 a feedback circuit utilizing the indication of the output power from the photodetector and the signal indicating the ambient temperature from the temperature sensor to form a power control signal to send a feedback signal to adjust the output power of the light source, and utilizing the signal related to the temperature of the light source from the photodetector and the signal indicating the ambient temperature from the temperature sensor to form a temperature control signal for adjusting the temperature of the light source thereby adjusting the wavelength thereof; and,
 a memory circuit operationally coupled to the feedback circuit and the temperature sensor for storing a lookup table comprising a plurality of stored values, said stored values accounting for the light from the light source coupled to the photodetector when it is forward biased and corresponding to control voltages for adjusting the feedback temperature control signal at a plurality of different ambient temperatures about the package and maintaining the wavelength of the light source substantially constant at the wavelength $W_s$ when the power of the light source changes and/or when the temperature about the light source changes.

BRIEF DESCRIPTION OF THE FIGURES

Exemplary embodiments of the invention will be described in accordance with the drawings, in which:
FIG. 2 is a graph of diode current versus voltage for a photodetector; and,
 FIG. 3 is a graph depicting typical diode voltage and differential voltage as a function of temperature.

DETAILED DESCRIPTION

Figure 1:
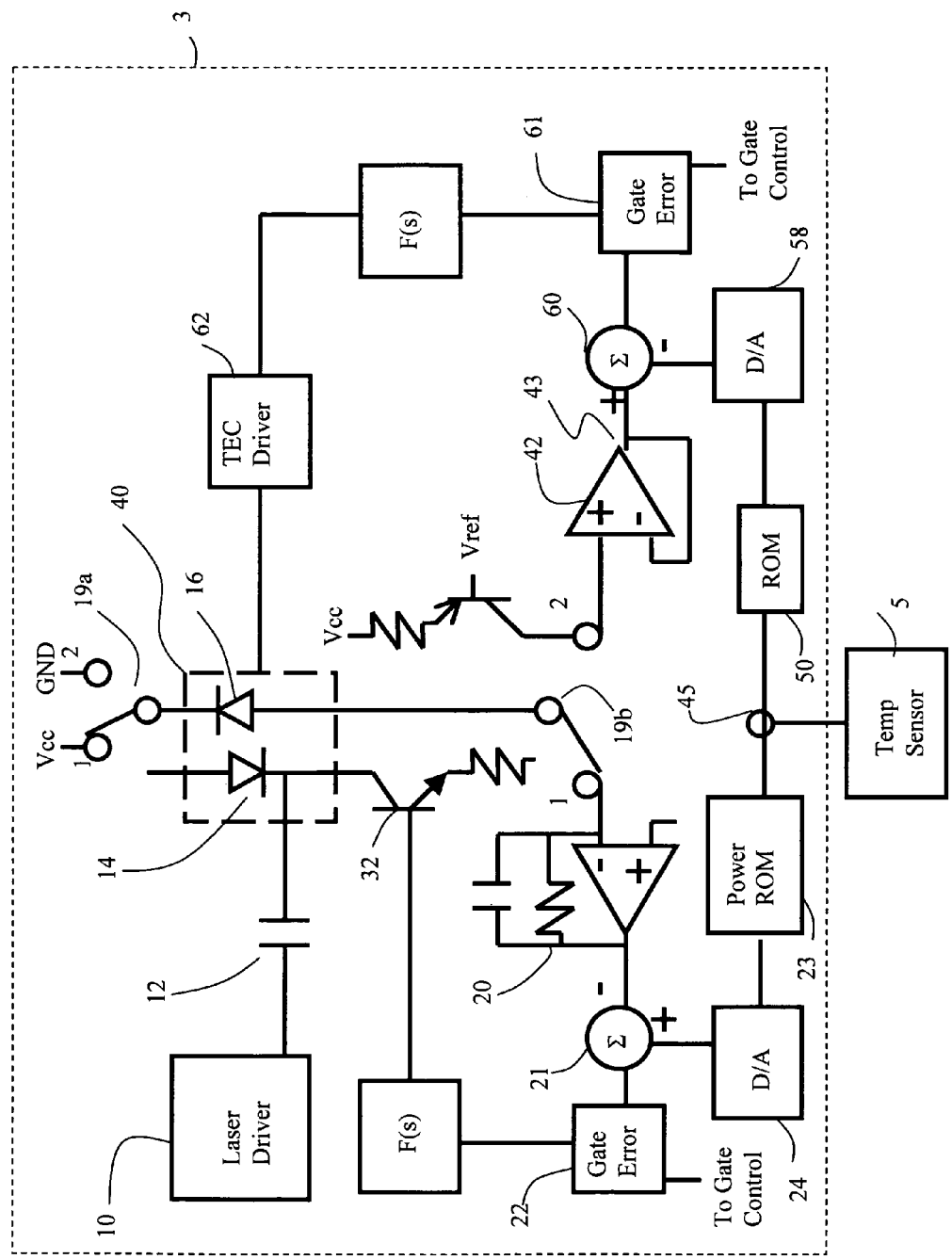
FIG. 1 is a circuit block diagram of the laser diode circuit in accordance with this invention.

Referring now to FIG. 1, a circuit is shown for providing a diode laser output signal having substantially non-varying output power at a substantially non-varying output wavelength. All of the components described hereafter are preferably contained within a hermetically sealed package 3, with the exception of a temperature sensor 5, which is disposed outside the package 3. Alternatively, all of the electronics may be disposed outside of a hermetically sealed portion of the package 3. An output signal from the temperature sensor 5 is electrically, coupled to components inside the hermetically sealed package 3.

A laser driver 10 is coupled through a capacitor 12 to an input terminal of a light emitting diode or laser diode 14. A photodiode or photodetector 16 is disposed close to the laser diode 14 for detecting the power of the output light therefrom, when the photodetector 16 is in a reversed biased mode of operation. In this mode of operation the photodetector 16 serves as a power sensor.

Thus, the photodiode 16 is normally used as a feedback device to measure the laser output power in a closed loop configuration, which adjusts the laser bias current to maintain a constant optical output power into an optical fiber optically coupled to received light from the laser diode 14. Turning now to FIG. 2, a typical diode current vs. voltage characteristic is shown. Normally photodiodes are operated in the region shown as the "Reverse Blocking Region"; i.e. they are reversed biased so the only current that flows is photonically generated. When operated in the "forward conducting region" of the curve, using a constant current source, and monitoring the resulting voltage drop across the photodiode 16, it may be used as a relatively accurate temperature measurement device. This is due to the consistent change in voltage drop across the photodiode 16 with a change in temperature, as illustrated in FIG. 3 for a silicon diode. When the laser output light is not incident upon the photodetector 16, this sensitivity is reasonably linear and predictable across the most often used temperature range of −40 to +85C. (233 to 358K), though wavelength stable lasers are typically controlled to within a fraction of one degree Celsius. Silicon is usually used in short wavelength systems (850 nm), while InGaAs is used at the longer telecommunications wavelengths of 1310 and 1550 nm. A similar effect of voltage vs. temperature occurs with both materials, therefore this invention is usable with these and other materials, which may be used for photodiodes in other wavelength ranges. Referring once again to FIG. 1 controllable switches 19a and 19b are provided for switching the photodetector 16 from a reversed biased mode of operation to a forward biased mode of operation. A first control circuit for power monitoring and control of the power level of the laser diode 14 includes a trans-impedance amplifier 20 having an output connected to a summing node error generator 21, connecting to a sample and hold gate error block 22. A power ROM 23 is controlled by a digital input signal TEMP from the external temperature sensor 5. The power ROM 23 is a table of binary values corresponding to reference voltages to the power control loop. The contents of this ROM 23 are set points, which are varied as a function of temperature. These set points can be set during manufacturing test for each unit or can be established through the collection of statistical data. A D/A converter 24 is used to convert the digital data to an analog signal for the error generator 21, which performs an analog subtraction. The entire functional block can be implemented in a processor by placing an A/D at the input side of trans-impedance amplifier 20. The gate signal serves to ensure the error signal is used by the power control loop only when the switches 19a and 19b are in position 1. When the switches are in position 2 the output of the gate signal is set to zero and the signal at the base of the transistor 32 is held at a constant voltage until the switches 19a and 19b are switched back to position 1.

A second control circuit for controlling a thermal electric cooler 40 (TEC) adjacent to the diodes 14 and 16 includes a comparator 42 having its negative input tied to an output terminal 43. When the switches 19a and 19b are toggled from the position shown to position 2, such that the photodetector 16 becomes forward biased, a voltage is present at terminal 43 that is proportional to temperature sensed by the photodetector 16. A ROM 50 having its unique contents programmed during manufacture of the device, includes control data stored at particular addresses for controlling the TEC 40 in dependence upon the temperature sensed by the photodetector 16, and in dependence upon an ambient temperature sensed by a temperature sensor 5 outside the laser diode package 3 provided as a digital input signal at terminal 45 used to address both the ROM 50 and the power ROM 23. A gate error control signal, between gate error blocks 22 and 61, ensures that only one control loop is functional while the other is disabled. In operation, the voltage at terminal 43 and the addressed data stored in ROM 50, converted to an analog signal by a D/A converter 58, are provided to a summing circuit 60. A difference in these input voltages yields a signal, which drives a TEC driver circuit 62 coupled to the TEC 40.

A novel aspect of the invention resides in the acquisition of data to be stored in the ROM 50, and the programming of the ROM 50 during test and manufacture of the wavelength stabilized laser diode 14. In order to ascertain the data set required to maintain the laser diode 14 at a constant output wavelength, the output wavelength is monitored. Once the output wavelength is at a desired output wavelength $W_d$ the temperature outside of the laser package 3 is raised or lowered from an initial temperature of 25.degree. C. and the output wavelength varies. The voltage of the photodiode 16 can be monitored and a binary number representing this voltage can be written into the ROM 50 or the ROM 50 contents can be varied up and down until the desired wave length is measured on a wave length meter. Typically, the values are relatively close and the 25.degree. C. values are simply increased or decreased slightly until the desired wavelength is obtained. This digital value is then provided to the D/A converter 58, which forces the TEC driver 62 to switch on, until the wavelength of the laser diode 14 approaches the desired wavelength $W_d$. Once this occurs the output signal at terminal 43 and the output signal at of the D/A 58 are compared and the difference becomes zero. The contents of the ROM 50 are acquired in this manner as the outside temperature is continually varied within a predetermined range of operating temperatures under which the device must perform. Hence, the contents of the ROM 50 are unique for each device. Alternatively, the contents could be derived through a collection of statistical data but the performance of each module would also be statistical and is loaded at production test.

In yet another embodiment as statistically compiled data set could be used as a seed set of values, which could be tested in the manner, described above, and altered as required during manufacture.

Numerous other embodiments may be envisaged, without departing from the spirit and scope of the invention.

What is claimed is:

1. A transmitter for providing a wavelength stabilized output signal having a wavelength $W_s$ comprising:
   a package for housing electronic and optical components;
   a light source disposed within the package for providing the output signal;
   a photodetector disposed within the package in close proximity to the light source, wherein at least a portion of the output signal is optically coupled to the photodetector;
   switching means for changing a bias on the photodetector between forward bias mode and reverse bias mode, whereby the photodetector provides an indication of the output power of the light source output signal when the photodetector is in the reverse bias mode, and a signal that is related to the temperature and output power of the light source when the photodetector is in the forward bias mode;
   a temperature sensor disposed outside of the package for providing a signal indicating an ambient temperature about the package;
   a feedback circuit utilizing the indication of the output power from the photodetector and the signal indicating the ambient temperature from the temperature sensor to form a power control signal to adjust the output power of the light source, and utilizing the signal related to the temperature of the light source from the photodetector and the signal indicating the ambient temperature from the temperature sensor to form a temperature control signal for adjusting the temperature of the light source thereby adjusting the wavelength thereof; and,
   a memory circuit operationally coupled to the feedback circuit and the temperature sensor for storing a lookup table comprising a plurality of stored values, said stored values corresponding to control voltages for adjusting the temperature control signal at a plurality of different ambient temperatures about the package and maintaining the wavelength of the light source substantially constant at the wavelength $W_s$ when the power of the light source changes and/or when the temperature about the light source changes.

2. A transmitter as defined in claim 1, wherein the stored values are test values determined by testing said transmitter during manufacture at the plurality of different ambient temperatures, while maintaining the output wavelength of the output signal at the wavelength $W_s$.

3. A transmitter as defined in claim 1, wherein the stored values are predetermined statistically.

4. A transmitter as defined in claim 2, further comprising a thermoelectric cooler (TEC) for varying the temperature and thereby the wavelength of the light source in dependence upon the temperature control signal, which is based on the signal related to the temperature of the light source and the ambient temperature about the package.

5. A transmitter as defined in claim 4, wherein the temperature control signal is derived from at least a stored test value within the lookup table, and the signal related to the temperature of the light source.

6. A transmitter as defined in claim 5, wherein the stored test value is selected in dependence upon an ambient temperature outside the package.

7. A transmitter as defined in claim 6, wherein the stored test value is converted to a voltage, and said voltage is compared with the signal related to the temperature of the light source to produce a difference signal for provision to the TEC for the control thereof.

8. A transmitter as defined in claim 4, wherein the photodetector is configured to receive light from the light source during a forward biased mode of operation, and wherein the stored values account for the output power of the light source received by the photodetector during the forward biased mode of operation.

9. A transmitter as defined in claim 1, wherein the package is hermetically sealed.

10. A method of manufacturing a laser transmitter having, in operation, an output signal with a substantially constant wavelength $W_c$, said method comprising the steps of:

providing a package for housing components;

providing within the package, a photodetector, and a light source in close proximity with the photodetector to be optically and substantially thermally coupled;

providing, within the package, switching means coupled with the photodetector for changing a bias on the photodetector between a forward bias mode and a reverse bias mode, to provide an indication of the output power of the light source output signal when the photodetector is in the reversed biased mode and for providing a signal that is related to the temperature of the light source in the forward biased mode;

providing within the package, a thermo-electric cooler (TEC) electrically coupled to control circuitry for receiving input information for controlling the temperature of the light source;

providing a temperature sensor disposed outside of the package for providing a signal indicating an ambient temperature about the package;

providing within the package a memory array for storing test values, the memory array being electrically coupled to the temperature sensor and with the TEC, and the TEC being responsive to the test values;

determining at least one test value that will effectively maintain the output signal at a wavelength of $W_c$ when the temperature of the package is varied, including the steps of:

varying a temperature of the environment about the package to a temperature $T_{test}$ to vary a temperature within the package;

simultaneously monitoring the wavelength of the output signal while the transmitter is in operation;

while the photodetector operating in the forward bias mode, utilizing a plurality of potential test values at said temperature to determine a test value that will effect a change in the wavelength of the output signal so that said wavelength substantially becomes $W_c$;

storing said at least one test value in the memory array at a location that is addressable by a digital value related to temperature $T_{test}$; and, providing said control circuitry within the package with means to compare a voltage related to an addressed test value within the memory array with an output voltage received from the photodetector when in a forward biased mode of operation.

11. In a laser transmitter having a plurality of components including:

a photodetector, a light source for generating an output signal with an output power, the light source being in close proximity with the photodetector to be optically and substantially thermally coupled therewith, a switch coupled with the photodetector for changing a bias on the photodetector between a forward bias mode and a reverse bias mode, to provide an indication of the output power of the light source output signal when the photodetector is in the reverse bias mode, and for providing a temperature signal that is related to the temperature of the light source in the forward bias mode, said temperature signal being electrically coupled with control circuitry, a TEC electrically coupled and responsive to said control circuitry for receiving input information for controlling the temperature of the light source, a temperature sensor disposed outside of the package for providing a signal indicating an ambient temperature about the package;

a memory array for storing predetermined values, the memory array being electrically coupled with the control circuitry and to the temperature sensor, said photodetector, light source, switch, TEC, memory array and control circuitry being housed within a hermetic package, a method of manufacture comprising the steps of:

in operation, changing the temperature about the package to a plurality of different temperatures to vary a temperature within the package while monitoring the wavelength of the output signal, while the photodetector operating in the forward bias mode, determining TEC control values for different temperatures that will substantially maintain the wavelength of the output signal at our about a predetermined desired operating wavelength $W_c$; and, storing said TEC control values in the memory array at locations addressable by digital values related to sensed temperature about the package.

* * * * *